US011775372B2

(12) United States Patent
Tung

(10) Patent No.: US 11,775,372 B2
(45) Date of Patent: Oct. 3, 2023

(54) LOGGING MESSAGES IN A BASEBOARD MANAGEMENT CONTROLLER USING A CO-PROCESSOR

(71) Applicant: QUANTA COMPUTER INC., Taoyuan (TW)

(72) Inventor: Yen-Ping Tung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 113 days.

(21) Appl. No.: 17/534,717

(22) Filed: Nov. 24, 2021

(65) Prior Publication Data
US 2023/0161658 A1    May 25, 2023

(51) Int. Cl.
| | | |
|---|---|---|
| G06F 11/00 | (2006.01) |
| G06F 11/07 | (2006.01) |
| G06F 9/38 | (2018.01) |
| G06F 11/14 | (2006.01) |
| G06F 13/42 | (2006.01) |

(52) U.S. Cl.
CPC ........ *G06F 11/0772* (2013.01); *G06F 9/3877* (2013.01); *G06F 11/0784* (2013.01); *G06F 11/141* (2013.01); *G06F 13/4282* (2013.01)

(58) Field of Classification Search
CPC ............. G06F 11/0772; G06F 11/0784; G06F 11/141; G06F 11/1417; G06F 9/3877
See application file for complete search history.

(56) References Cited

U.S. PATENT DOCUMENTS

| | | |
|---|---|---|
| 2013/0117803 A1 | 5/2013 | Markham et al. |
| 2018/0213669 A1 | 7/2018 | Kochukunju |
| 2020/0319975 A1* | 10/2020 | Luong ................. G06F 11/1417 |

FOREIGN PATENT DOCUMENTS

| | | |
|---|---|---|
| TW | I306198 B | 2/2009 |
| TW | 201314576 A | 4/2013 |
| TW | I512490 B | 12/2015 |
| TW | I571736 B | 2/2017 |

OTHER PUBLICATIONS

Extended European Search Report for EP Application No. 22165880.0, dated Sep. 5, 2022.

(Continued)

*Primary Examiner* — Philip Guyton
(74) *Attorney, Agent, or Firm* — NIXON PEABODY LLP

(57) ABSTRACT

Embodiments of this disclosure are directed towards a method of logging messages in a baseboard management controller (BMC) system. The method includes powering on a processing chip of the BMC system, wherein the processing chip has a main processor and a co-processor that is communicatively coupled to a non-transitory processor-readable memory device and snooping interface. The method further includes booting up the co-processor, and initiating a storage portion of the non-transitory processor-readable memory device the snooping interface. The method further includes triggering a boot-up of the main processor, and receiving, via the snooping interface, the messages redirected from a communication interface of the BMC system.

18 Claims, 3 Drawing Sheets

(56) References Cited

OTHER PUBLICATIONS

Zhang Xiaolan et al., "Secure Coprocessor-based Intrusion Detection", ACM SIGOPS European Workshop; ACM, 2 Penn Plaza, Suite 701, New York, NY 10121-0701; Jul. 1, 2002, pp. 239-242, USA; XP58273960A.
TW Office Action for Application No. 111110777, dated Feb. 24, 2023 w/ First Office Action Summary.
TW Search Report for Application No. 111110777, dated Feb. 24, 2023, w/ First Office Action.
Communication pursuant to Article 94(3) EPC for EP Application No. 22165880.0-1203, dated Feb. 23, 2023.
Anonymous: "Event monitoring—Wikipedia", Nov. 29, 2018 (Nov. 29, 2018), pp. 1-2, XP093023622, Retrieved from the Internet: URL:https://en.wikipedia.org/w/index.php?title=Event_monitoring&oldid=871191379 [retrieved on Feb. 14, 2023].

* cited by examiner

LOGGING MESSAGES IN A BASEBOARD MANAGEMENT CONTROLLER USING A CO-PROCESSOR

FIELD OF THE INVENTION

The present invention relates generally to a baseboard management controller (BMC) used in servers, and more specifically, to systems and methods of logging messages using a co-processor of the BMC.

BACKGROUND OF THE INVENTION

Servers are employed in large numbers for high demand applications, such as network-based systems or data centers. The emergence of cloud computing applications has increased the demand for data centers. Each server generally includes hardware components such as processors, memory devices, network interface cards, power supplies, and other specialized hardware. Servers generally include a baseboard management controller (BMC) that manages the operation of hardware components as well as support components, such as power supplies and fans. The BMC also communicates operational data to a central management station that manages the servers of the rack. The BMC relieves the need for the Central Processing Unit (CPU) of the server to monitor server operations. It is thus desirable to keep and track a log of messages and events that occur during boot-up and operation of the BMC.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a method of logging messages in a baseboard management controller (BMC) system includes powering on a processing chip of the BMC system, wherein the processing chip has a main processor and a co-processor that is communicatively coupled to a non-transitory processor-readable memory device and snooping interface. The method further includes booting up the co-processor, and initiating a storage portion of the non-transitory processor-readable memory device the snooping interface. The method further includes triggering a boot-up of the main processor, and receiving, via the snooping interface, the messages redirected from a communication interface of the BMC system.

According to certain aspects of the present disclosure, the method further includes saving the received messages in the non-transitory processor-readable memory device.

According to certain aspects of the present disclosure, the method step of booting up the co-processor is performed before the main processor is powered on, if the co-processor is powered on before the main processor.

According to certain aspects of the present disclosure, the method step of booting up the co-processor is performed by triggering a boot-up of the co-processor by the main processor, if the main processor is powered on before the co-processor.

According to certain aspects of the present disclosure, the method further includes routing the redirected messages externally through traces of a printed circuit board (PCB) on which the BMC system is embedded.

According to certain aspects of the present disclosure, the method further includes routing the redirected messages internally within the processing chip, the routing including programming registers between a transmitter of the communication interface and a receiver of the snooping interface.

According to certain aspects of the present disclosure, a baseboard management controller (BMC) system is disclosed. The BMC system includes a processing chip having a built-in main processor and a built-in co-processor, at least one communication interface communicatively coupled to the main processor, at least one snooping interface coupled to the co-processor, and a non-transitory processor-readable memory device communicatively coupled to the co-processor. The memory device includes a storage portion. The memory device has machine-readable instructions saved thereon, which when executed, configure the co-processor to perform a method of logging messages. The method includes powering on a processing chip of the BMC system, booting up the co-processor, and initiating the storage portion and the at least one snooping interface. The method further includes triggering a boot-up of the main processor, and receiving the messages redirected from the at least one communication interface of the BMC system via the at least one snooping interface.

According to certain aspects of the present disclosure, the co-processor is further configured to save the received messages in the non-transitory processor-readable memory device.

According to certain aspects of the present disclosure, the at least one communication interface is a Universal Asynchronous Receiver/Transmitter (UART) interface, a Universal Serial Bus interface, a General Purpose Input/Output (GPIO) interface, an Inter-Integrated Circuit (I2C) interface, a management console interface, or a debug interface.

According to certain aspects of the present disclosure, the co-processor is further configured to boot up before the main processor is powered on, if the co-processor is powered on before the main processor.

According to certain aspects of the present disclosure, the main processor is configured to trigger a boot-up of the co-processor, if the main processor is powered on before the co-processor According to certain aspects of the present disclosure, the received messages include booting messages, error messages, and exception messages generated during boot-up and operation of the main processor.

According to certain aspects of the present disclosure, the booting messages are associated with (i) a boot-up event, (ii) an operating system loading event, (iii) a Random Access Memory (RAM) disk decompression event, and (iv) runtime services of the main processor.

According to certain aspects of the present disclosure, the BMC system further includes traces on a printed circuit board (PCB) on which the processing chip is embedded, wherein the traces are configured to route the redirected messages external to the processing chip.

According to certain aspects of the present disclosure, the processing chip further includes registers between a transmitter of the at least one communication interface of the main processor and a receiver of the at least one snooping interface of the co-processor, wherein the registers are programmed to route the redirected messages internally within the processing chip.

According to certain aspects of the present disclosure, the non-transitory processor-readable memory device communicatively coupled to the co-processor is an electronic multimedia card (eMMC), a Serial Advanced Technology Attachment (SATA) device, a Serial Attached SCSI (SAS) device, a multimedia card (MMC), a Universal Serial Bus (USB) disk, a Peripheral Connect Interface express (PCIe) disk, a Serial Peripheral Interface (SPI) disk, an enhanced Serial Peripheral Interface (eSPI) disk, or a Secure Digital Input Output (SDIO) card.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

Figure 1:
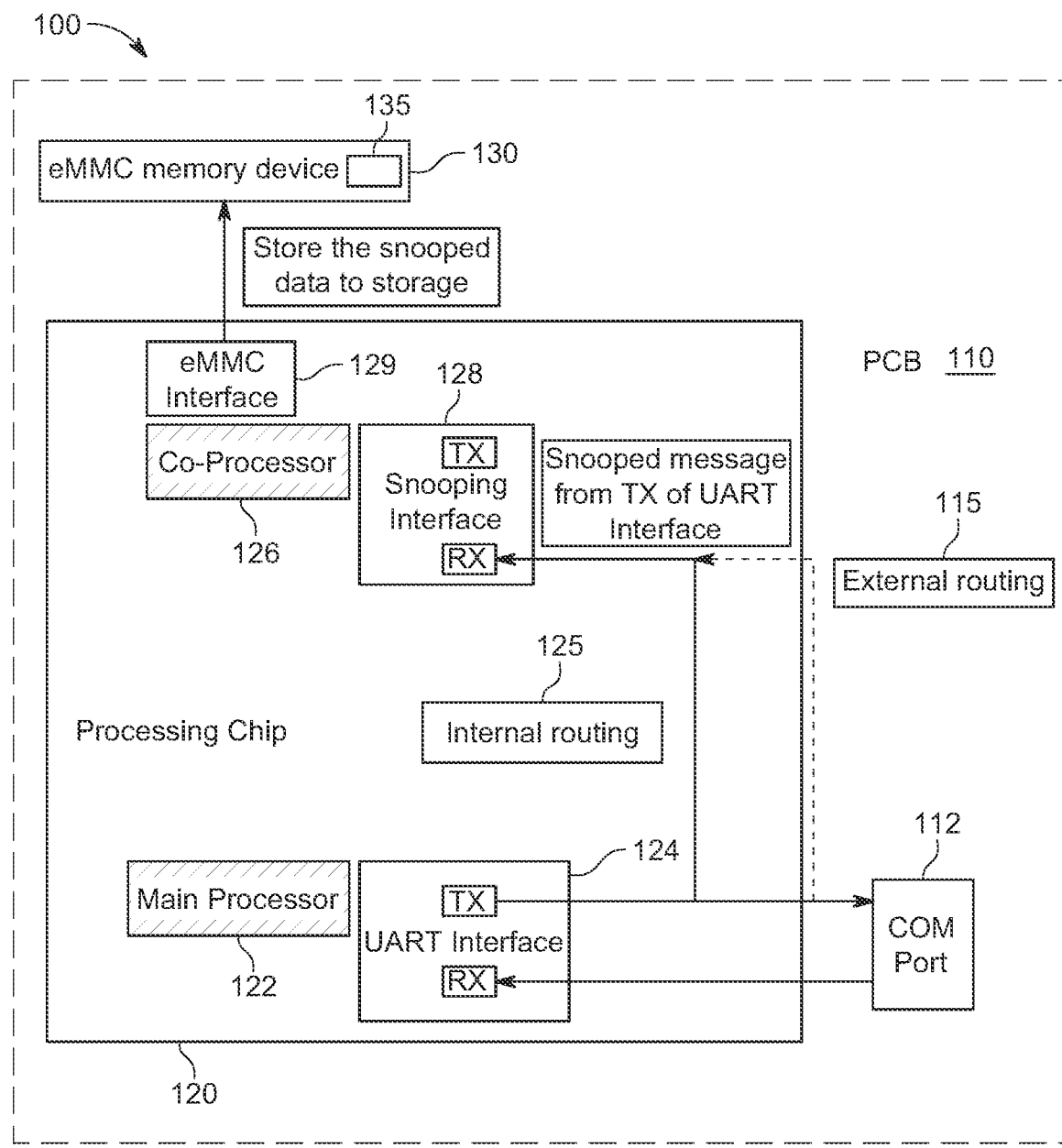
FIG. 1 shows a schematic diagram of a BMC system having an architecture for logging messages using a co-processor of the BMC system, according to certain aspects of the present disclosure.

The present disclosure is susceptible to various modifications and alternative forms, and some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

Embodiments of the disclosure are directed to BMC systems and methods of logging messages using a co-processor of the BMC. The co-processor boots up before a main processor in a processing chip of the BMC system, and booting messages, error messages, and exception messages generated during boot-up and operation of the main processor are redirected from a communication interface of the BMC system via a snooping interface into the co-processor. The messages are then saved in a memory device that is communicatively coupled to the co-processor for future use and analysis. Further details on the implementations are described below.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

FIG. 1 shows a schematic diagram of a BMC system 100 having an architecture for logging messages using a co-processor of the BMC system 100. The BMC system 100 manages operations, such as power management and thermal management for a server. The BMC system 100 effectively controls power supply and fan modules, according to data received from power and thermal sensors in the server. The BMC system 100 also receives operational data from, and provides settings to, various hardware components for the server. In the non-limiting embodiment shown in FIG. 1, the BMC system 100 includes a printed circuit board (PCB) 110, a processing chip 120, and an embedded multimedia card (eMMC) memory device 130.

The processing chip 120 is a system-on-chip (SOC) that includes a built-in main processor 122 and a built-in co-processor 126 electrically connected to an external bus 112, called COM Port, embedded on the PCB 110. The processing chip 120 is configured to periodically monitor power data and other support for the electronic components of the BMC system 100 and the server, of which the BMC system 100 is a component of. In some embodiments, the monitoring rate of the processing chip 120 is dependent on the temperature and/or power data associated with the electronic components of the BMC system 100 and the server. In some embodiments, the processing chip 120 may be manufactured by ASPEED Technology (e.g., AST2500), Nuvoton (e.g., NPCM730), or Texas Instruments (e.g., Sitara).

The main processor 122 is coupled to a communication interface 124 having a receiver RX configured to receive an input from, and a transmitter TX configured to send an output to, a device or a bus such as, but not limited to, the external bus 112. In the non-limiting example shown in FIG. 1, the communication interface 124 is a Universal Asynchronous Receiver/Transmitter (UART) interface configured for host serial communication over Local Area Network (LAN) or debugging. However, in other embodiments, one or more communication interfaces 124, each having a different communication protocol, may be used. The communication interfaces 124 may be a Universal Serial Bus (USB) interface, a General Purpose Input/Output (GPIO) interface, an Inter-Integrated Circuit (I2C) interface, a management console interface, and/or a debug interface. As a non-limiting example, a GPIO interface may be used to control visual indicators such as LEDs that indicate BMC system heartbeat, BMC system health, Basic Input/Output System (BIOS) Power-On Self-Test (POST) code, power status, devices that are present (e.g., HDDs, SSDs, etc.) or any other statuses that the processing chip 120 can monitor. As another non-limiting example, a management console interface may be used for BIOS firmware updates or debug logging storage. The main processor 122 is a relatively more powerful programmable control device than the co-processor 126.

The co-processor 126 is communicatively coupled to the eMMC memory device 130, though any non-transitory processor-readable memory device may be used such as, but not limited to, a Serial Advanced Technology Attachment (SATA) device, a Serial Attached SCSI (SAS) device, a multimedia card (MMC), a Universal Serial Bus (USB) disk, a Peripheral Connect Interface express (PCIe) disk, a Serial Peripheral Interface (SPI) disk, an enhanced Serial Peripheral Interface (eSPI) disk, a Secure Digital Input Output (SDIO) card, and the like. The eMMC memory device 130 stores firmware that is executed by the co-processor 126 to perform various functions such as logging events, storing data and messages, etc. The eMMC memory device 130 includes a storage portion 135 for storing executable program code, data, and messages. The co-processor 126 is coupled to an eMMC interface 129 for connecting the co-processor 126 to the eMMC memory device 130.

The co-processor 126 is also coupled to a snooping interface 128 having a receiver RX configured to receive an input from, and a transmitter TX configured to send an output to a device or a bus such as, but not limited to, the UART communication interface 124 or another communication interface 124. In some embodiments, the snooping interface 128 is communicatively coupled to the UART communication interface 124 through an internal route 125 of programmable registers between the transmitter TX of the UART communication interface 124 and the receiver RX of the snooping interface 128 of the co-processor 126. In other embodiments, the snooping interface 128 is communicatively coupled to the UART communication interface 124 through an external route 115 of traces on the PCB 110.

Figure 2:
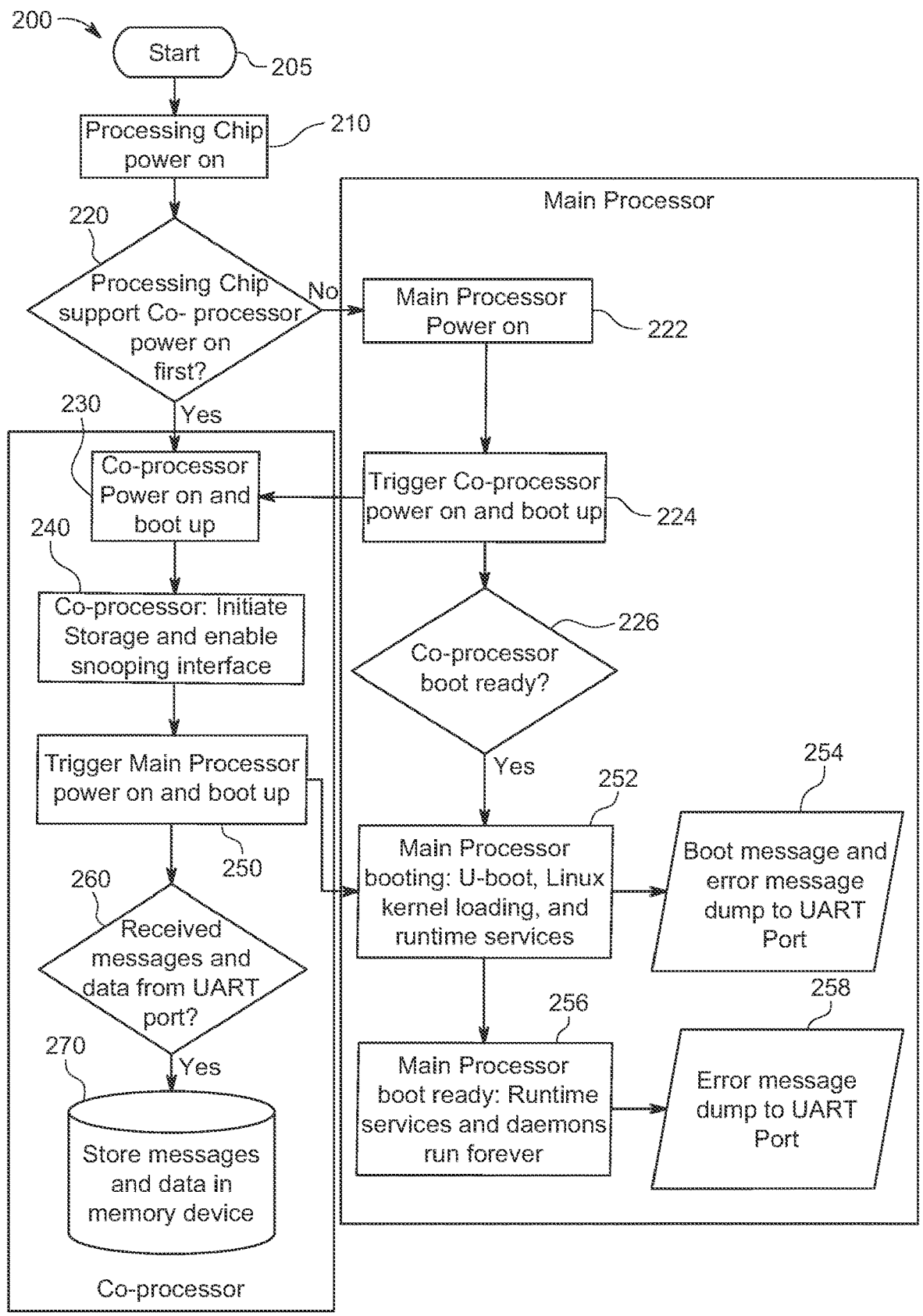
FIG. 2 shows a flow diagram demonstrating how the BMC system of FIG. 1 logs messages using the co-processor, according to certain aspects of the present disclosure.

FIG. 2 shows a flow diagram 200 demonstrating how the BMC system 100 logs messages using the co-processor 126. The BMC system 100 starts the process in step 205 and subsequently in step 210, the processing chip 120 is powered on. At decision point 220, the BMC system 100 decides if the processing chip 120 can support powering on the co-processor 126 first.

If the processing chip 120 cannot support powering on the co-processor 126, the main processor 122 is powered on in step 222. The main processor 122 then triggers a power-on and boot-up of the co-processor 126 in step 224. Subsequently, at decision point 226, the main processor 122 decides if the co-processor 126 is ready for boot-up or in the alternative, waits until the co-processor 126 is ready for boot-up.

On the other hand, if the processing chip 120 can support powering on the co-processor 126, the co-processor 126 is powered on and booted up before the main processor 122 is powered on, in step 230. Then, in step 240, the co-processor 126 both initiates the storage portion 135 of the eMMC memory device 130 and enables the snooping interface 128. This triggers the main processor 122 to power on and boot up, in step 250.

In step 252, the main processor 122 undergoes the booting process, including a boot-up event (u-boot), an operating system loading event (e.g., Linux kernel loading), a Random Access Memory (RAM) disk decompression event, and runtime services. Any booting messages, error messages, exception messages, and data generated during boot-up is then dumped or directed towards the UART communication interface 124, in step 254.

Similarly, once the main processor 122 has booted up, the main processor 122 moves on to an operational status in step 256, during which runtime services and daemons may be generated and executed. Any booting messages, error messages, exception messages, and data generated during operation of the main processor 122 is then dumped or directed towards the UART communication interface 124, in step 258.

The booting messages, error messages, exception messages, and data generated during boot-up and operation of the main processor 122 in steps 254 and 258 are then redirected into the snooping interface 128. At decision point 260, the co-processor 126 confirms receipt of the redirected messages and data from the UART communication interface 124 via the snooping interface 128. Subsequently, the co-processor 126 proceeds to store the redirected messages and data in the eMMC memory device 130 through the eMMC interface 129. The stored messages can be retrieved through the local area network (LAN) of the BMC system 100 or stored in a portable Secured Digital (SD) card.

Figure 3:
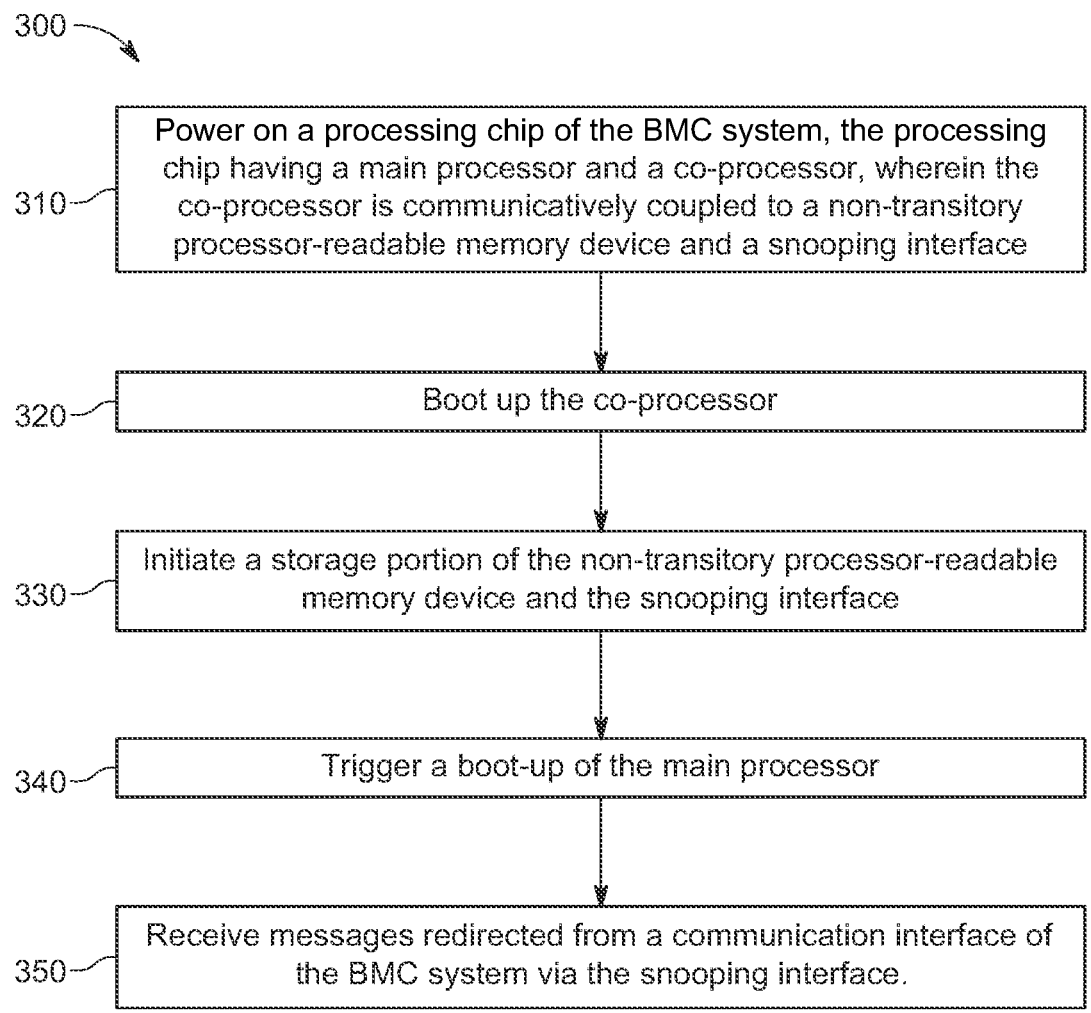
FIG. 3 shows a block diagram of a method of logging messaging in a BMC system using a co-processor, according to certain aspects of the present disclosure.

FIG. 3 shows a block diagram of a method 300 of logging messages in a BMC system using a co-processor; for example, the co-processor 126 in the BMC system 100. The method 300 begins in block 310, where a processing chip of the BMC system is powered on. The processing chip includes a main processor and a co-processor. The co-processor is communicatively coupled to a non-transitory processor-readable memory device and a snooping interface. The method 300 then proceeds to block 320, where the co-processor is booted up. In some embodiments, the co-processor is further configured to boot up before the main processor is powered on, if the co-processor is powered-on before the main processor. In other embodiments, the main processor is configured to trigger a boot-up of the co-processor, if the main processor is powered on before the co-processor.

In block 330, after the co-processor is booted, a storage portion of the non-transitory processor-readable memory device and the snooping interface are initiated. In some embodiments, the non-transitory processor-readable memory device may be an electronic multimedia card (eMMC), a Serial Advanced Technology Attachment (SATA) device, a Serial Attached SCSI (SAS) device, a multimedia card (MMC), a Universal Serial Bus (USB) disk, a Peripheral Connect Interface express (PCIe) disk, a Serial Peripheral Interface (SPI) disk, an enhanced Serial Peripheral Interface (eSPI) disk, a Secure Digital Input Output (SDIO) card, and the like. In block 340, a boot-up of the main processor is triggered by the BMC system.

In block 350, the method 300 proceeds to receive messages redirected from a communication interface of the BMC system via the snooping interface. In some embodiments, the communication interface may be a Universal Asynchronous Receiver/Transmitter (UART) interface, a Universal Serial Bus (USB) interface, a General Purpose Input/Output (GPIO) interface, an Inter-Integrated Circuit (I2C) interface, a management console interface, and/or a debug interface.

In some embodiments, the messages comprise booting messages, error messages, and exception messages generated during boot-up and operation of the main processor. In some embodiments, the booting messages are associated with a boot-up event (u-boot), an operating system loading event (e.g., Linux kernel loading), a RAM disk decompression event, and runtime services of the main processor. In some embodiments, the method further includes saving the received messages in the non-transitory processor-readable memory device for future use and analysis.

In some embodiments, the method further includes routing the redirected messages externally through traces of a printed circuit board (PCB) on which the BMC system is embedded. In other embodiments, the method further includes routing the redirected messages internally within the processing chip, wherein registers between a transmitter of the communication interface and a receiver of the snooping interface are programmed for the routing.

Advantageously, the systems and methods of logging messages using a co-processor of the BMC, as described herein, can benefit both the developer and the end-user of the server by retrieving booting messages, error messages, exception messages, and data related to potential system issues like sudden hang-up of the processing chip in the BMC system, inability of the BMC system to boot up properly, network disconnection of the BMC system, reboot of the watchdog timeout of the BMC system, etc. Error and/or exception messages with any of these or similar issues are sent to a communication interface of the BMC system, but cannot be otherwise retrieved, if the BMC system is not fully functional. Therefore, the systems and methods described herein use the existing co-processor in the processing chip of the BMC system to monitor, store, and analyze messages during boot-up and operation of BMC system, without incurring cost of additional devices for intercepting messages from the communication system.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

The invention claimed is:

1. A method of logging messages in a baseboard management controller (BMC) system, the method comprising:
powering on a processing chip of the BMC system, the processing chip having a main processor and a co-processor, the co-processor communicatively coupled to a non-transitory processor-readable memory device and a snooping interface;
booting up the co-processor;
initiating a storage portion of the non-transitory processor-readable memory device and the snooping interface;
triggering a boot-up of the main processor;
receiving, via the snooping interface, the messages redirected from a communication interface of the BMC system by routing the redirected messages internally within the processing chip, the routing including programming registers between a transmitter of the communication interface and a receiver of the snooping interface.

2. The method of claim 1, further comprising saving the received messages in the non-transitory processor-readable memory device.

3. The method of claim 1, wherein the communication interface is one of: a Universal Asynchronous Receiver/Transmitter (UART) interface, a Universal Serial Bus interface, a General Purpose Input/Output (GPIO) interface, an Inter-Integrated Circuit (I2C) interface, a management console interface, or a debug interface.

4. The method of claim 1, wherein the booting up the co-processor is performed before the main processor is powered on, if the co-processor is powered on before the main processor.

5. The method of claim 1, wherein the booting up the co-processor is performed by triggering a boot-up of the co-processor by the main processor, if the main processor is powered on before the co-processor.

6. The method of claim 1, wherein the received messages comprise booting messages, error messages, and exception messages generated during boot-up and operation of the main processor.

7. The method of claim 6, wherein the booting messages are associated with (i) a boot-up event, (ii) an operating system loading event, (iii) a RAM disk decompression event, and (iv) runtime services of the main processor.

8. The method of claim 1, further comprising routing the redirected messages externally through traces of a printed circuit board (PCB) on which the BMC system is embedded.

9. The method of claim 1, wherein the non-transitory processor-readable memory device communicatively coupled to the co-processor is one of: an electronic multimedia card (eMMC), a Serial Advanced Technology Attachment (SATA) device, a Serial Attached SCSI (SAS) device, a multimedia card (MMC), a Universal Serial Bus (USB) disk, a Peripheral Connect Interface express (PCIe) disk, a Serial Peripheral Interface (SPI) disk, an enhanced Serial Peripheral Interface (eSPI) disk, or a Secure Digital Input Output (SDIO) card.

10. A baseboard management controller (BMC) system, comprising:
a processing chip including a built-in main processor and a built-in co-processor;
at least one communication interface communicatively coupled to the main processor;
at least one snooping interface coupled to the co-processor; and
a non-transitory processor-readable memory device communicatively coupled to the co-processor and having a storage portion, the memory device having machine-readable instructions saved thereon, which when executed configure the co-processor to:
power on the processing chip;
boot up the co-processor;
initiate the storage portion and the at least one snooping interface;
trigger a boot-up of the main processor; and
receive messages redirected from the at least one communication interface via the at least one snooping interface;
wherein the processing chip further includes registers between a transmitter of the at least one communication interface and a receiver of the at least one snooping interface, the registers being programmed to route the redirected messages internally within the processing chip.

11. The BMC system of claim 10, wherein the co-processor is further configured to save the received messages in the non-transitory processor-readable memory device.

12. The BMC system of claim 10, wherein the at least one communication interface is one of: a Universal Asynchronous Receiver/Transmitter (UART) interface, a Universal Serial Bus interface, a General Purpose Input/Output (GPIO) interface, an Inter-Integrated Circuit (I2C) interface, a management console interface, or a debug interface.

13. The BMC system of claim 10, wherein the co-processor is further configured to boot up before the main processor is powered on, if the co-processor is powered on before the main processor.

14. The BMC system of claim 10, wherein the main processor is configured to trigger a boot-up of the co-processor, if the main processor is powered on before the co-processor.

15. The BMC system of claim 10, wherein received messages comprise booting messages, error messages, and exception messages generated during boot-up and operation of the main processor.

16. The BMC system of claim 15, wherein the booting messages are associated with (i) a boot-up event, (ii) an operating system loading event, (iii) a RAM disk decompression event, and (iv) runtime services of the main processor.

17. The BMC system of claim 10, further comprising traces on a printed circuit board (PCB) on which the processing chip is embedded, wherein the traces are configured to route the redirected messages external to the processing chip.

18. The BMC system of claim 10, wherein the non-transitory processor-readable memory device communicatively coupled to the co-processor is one of: an electronic multimedia card (eMMC), a Serial Advanced Technology Attachment (SATA) device, a Serial Attached SCSI (SAS) device, a multimedia card (MMC), a Universal Serial Bus (USB) disk, a Peripheral Connect Interface express (PCIe) disk, a Serial Peripheral Interface (SPI) disk, an enhanced Serial Peripheral Interface (eSPI) disk, or a Secure Digital Input Output (SDIO) card.

* * * * *